April 18, 1961  M. A. RAMIREZ, SR  2,980,012
MACHINE FOR PROCESSING DOUGH PRODUCTS
Filed Oct. 9, 1958  7 Sheets-Sheet 2

INVENTOR
Miguel A. Ramirez, Sr.

BY Mason, Fenwick & Lawrence
ATTORNEYS

April 18, 1961 M. A. RAMIREZ, SR 2,980,012
MACHINE FOR PROCESSING DOUGH PRODUCTS
Filed Oct. 9, 1958 7 Sheets-Sheet 3

INVENTOR
Miguel A. Ramirez Sr.

BY Mason, Fenwick & Lawrence
ATTORNEYS

April 18, 1961  M. A. RAMIREZ, SR  2,980,012
MACHINE FOR PROCESSING DOUGH PRODUCTS
Filed Oct. 9, 1958  7 Sheets-Sheet 5

INVENTOR
Miguel A. Ramirez, Sr.

BY Mason, Fenwick & Lawrence
ATTORNEYS

April 18, 1961  M. A. RAMIREZ, SR  2,980,012

MACHINE FOR PROCESSING DOUGH PRODUCTS

Filed Oct. 9, 1958  7 Sheets-Sheet 6

INVENTOR
Miguel A. Ramirez, Sr.

BY Mason, Fenwick & Lawrence
ATTORNEYS

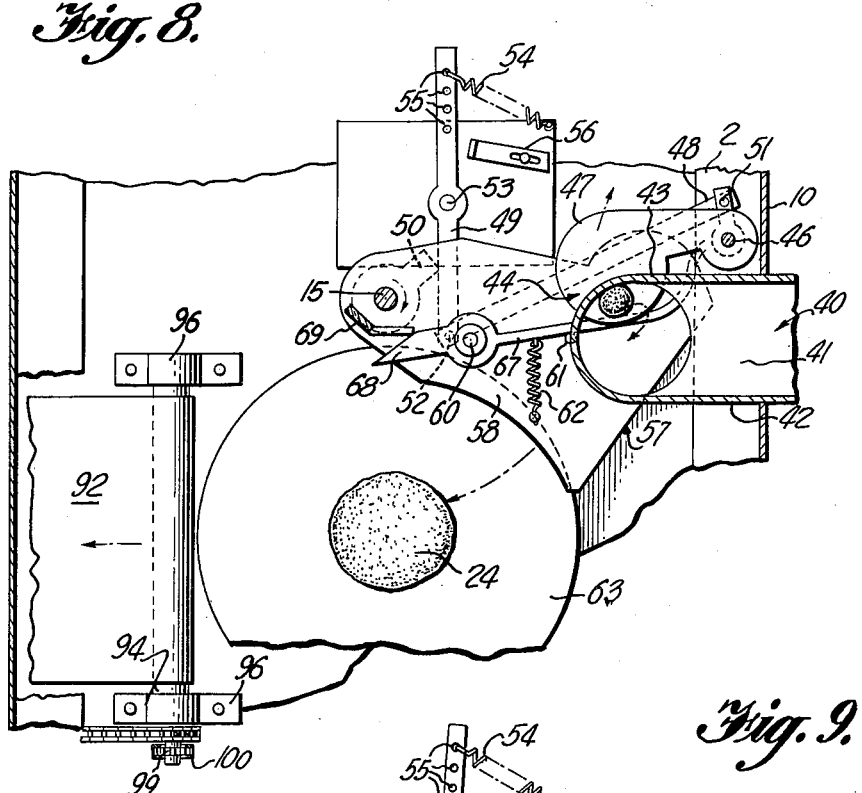
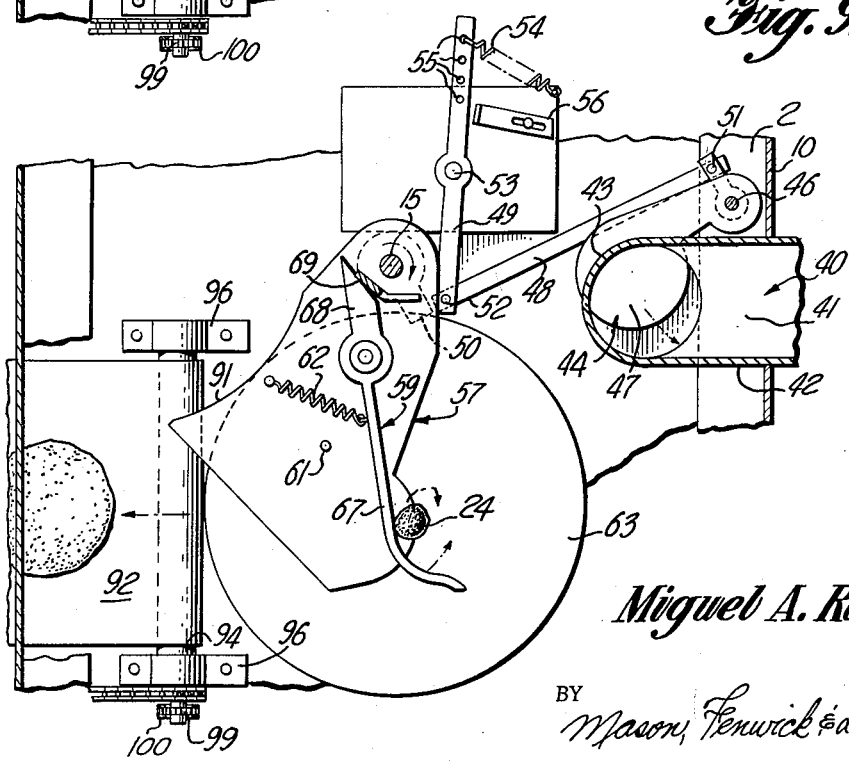

United States Patent Office 2,980,012
Patented Apr. 18, 1961

2,980,012

MACHINE FOR PROCESSING DOUGH PRODUCTS

Miguel A. Ramirez, Sr., 1307 Wyoming St., El Paso, Tex.

Filed Oct. 9, 1958, Ser. No. 766,285

11 Claims. (Cl. 99—353)

This invention relates to machines for preparing flour dough products which are particularly adapted to the preparation of tortillas.

The general object of the present invention is to provide a machine which will receive dough patties, balls, or dough in unit amounts, compress and spread the dough to desired size, partially cook the dough, and deliver the precooked product from the machine.

A more specific object of the invention is to provide a machine of this character where the compression and cooking of the product are accomplished in a one step operation.

Another object is the provision of such a machine wherein the heating temperature can be controlled in accordance with the speed of the machine to determine the quantity output of the machine.

A further object of the invention is to provide a machine which will automatically carry the product through it, subject it to various treatment and deliver the finished product.

Other objects of the invention will become apparent from the following description of one practical embodiment thereof, when taken in conjunction with the drawings which accompany, and form part of, this specification.

In the drawings:

Figure 8 is a partial horizontal section, similar to Figure 7, showing the transfer means in a different position; and Figure 9 is a view similar to Figure 8 but illustrating the transfer mechanism in still another position.

In general, the machine of the present invention comprises means to feed dough patties to a receiving platform from which it is transferred to a supporting and heating plate. While on the plate, the dough is compressed by a compressing and heating plate, which moves downwardly toward the first-mentioned plate, and the flattened dough is partially cooked, or precooked, between the plates. The cooked product is removed from the plate by the transfer means which placed it there, and placed on a discharge conveyor for removal from the machine.

Figure 6:
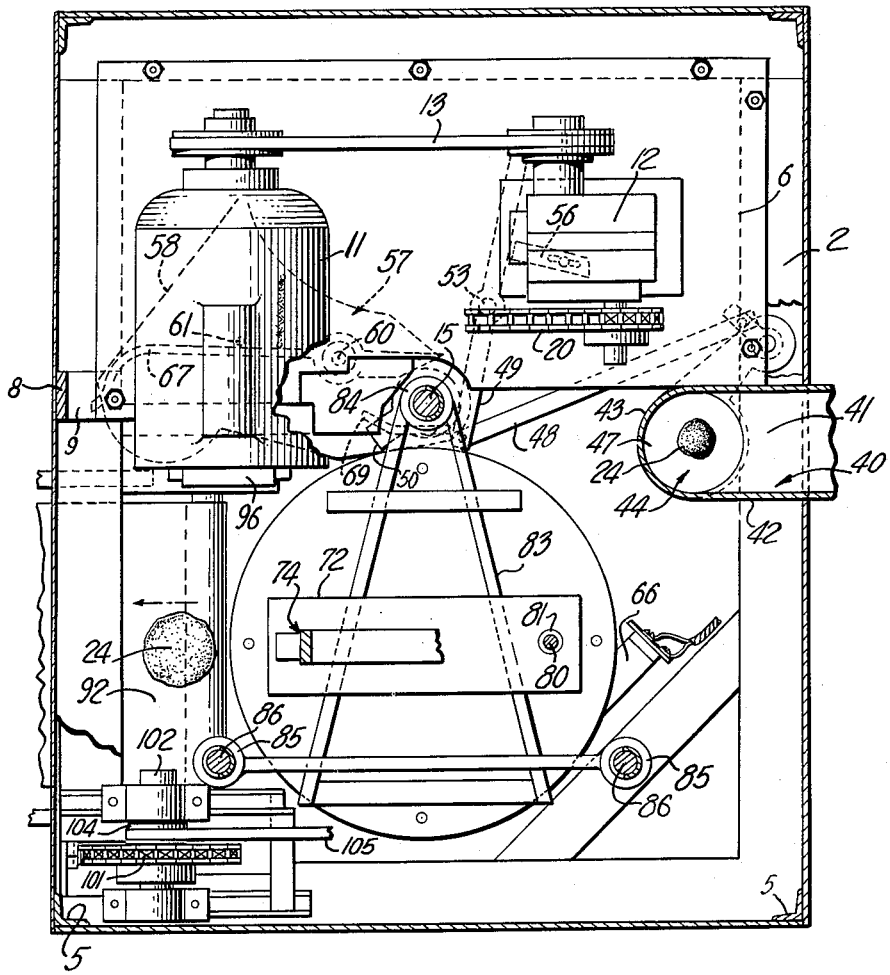
Figure 6 is a horizontal section taken on the line 6—6 of Figure 4, illustrating particularly the supporting structure for the top pressure and heating plates.

Referring to the drawings in detail, there is shown a frame 1 upon which the various elements of the machine may be supported. The frame, of course, can take any suitable form, but for purposes of illustration it is shown as consisting of a bottom rectangular frame member 2 of right angular cross-section, a top frame member 3 of similar shape, and an intermediate frame member 4 also of rectangular form. These three frame members are held in vertical spaced relation by four corner posts 5 which are welded to the corners of the several frame members. A platform 6 extends across the rear portion of the frame and is supported along its rear edge upon the horizontal flange of an angle member 7 which spans the rear of the frame and is welded to the two rear legs, or corner posts 5. Straps 8 (see Figures 4 and 6) fixed to the lower and intermediate frame members 2 and 4, have horizontally extending brackets, or seats, 9 upon which the forward corners of the platform rest. The entire frame and machine may be enclosed in any suitable housing, or cover, 10.

The platform 6 forms a mounting bed for a driving motor 11 and a gear reductor 12 driven from the motor by V-belt 13, which serve to supply the power to operate the machine.

Figure 1:
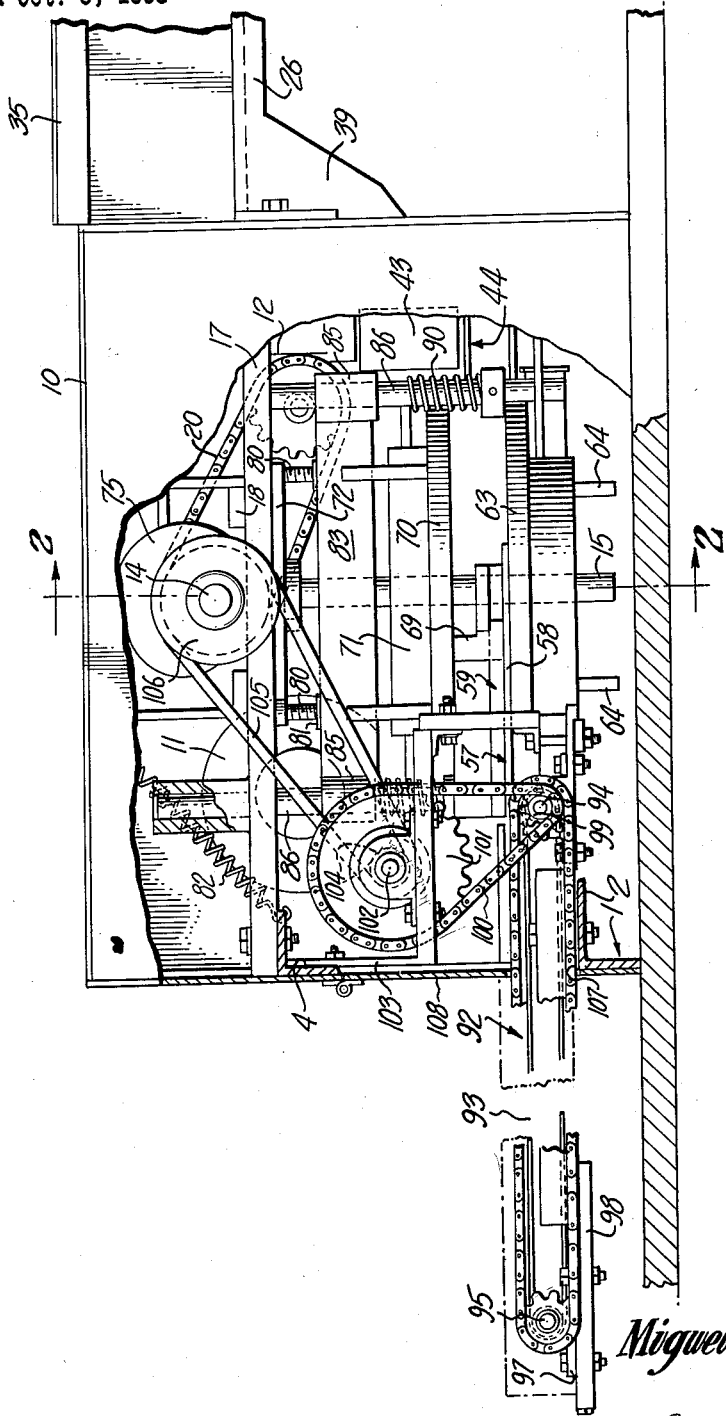
Figure 1 is a side view of a machine for handling dough products which incorporates the principles of the present invention, parts of the casing being broken away to show the interior.
Figure 2:
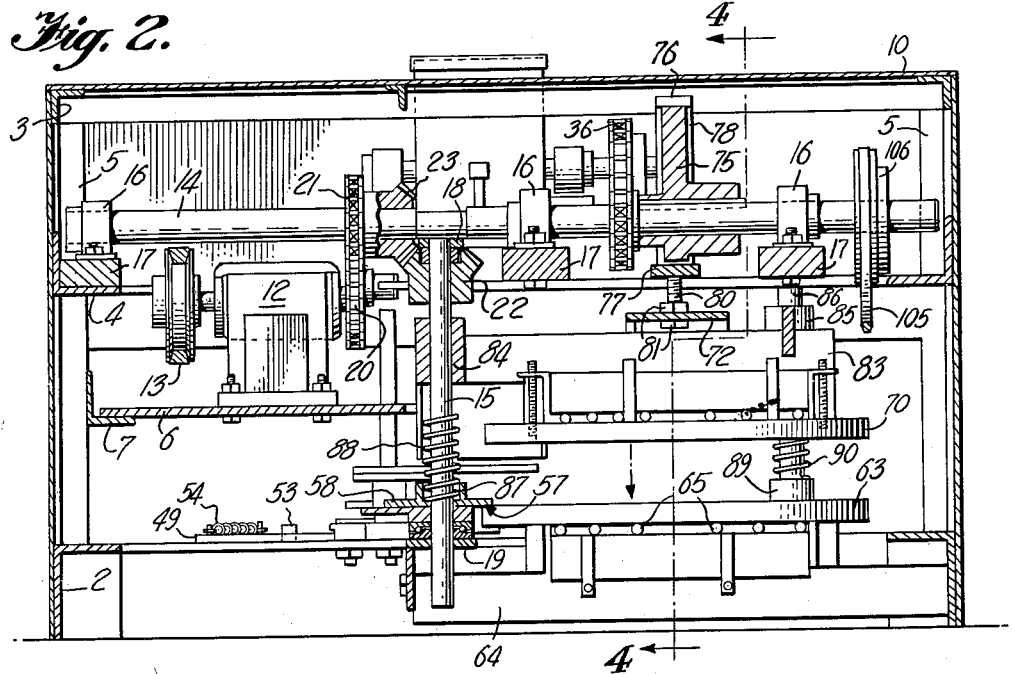
Figure 2 is a vertical transverse section through the machine, taken on the line 2—2 of Figure 1.
Figure 3:
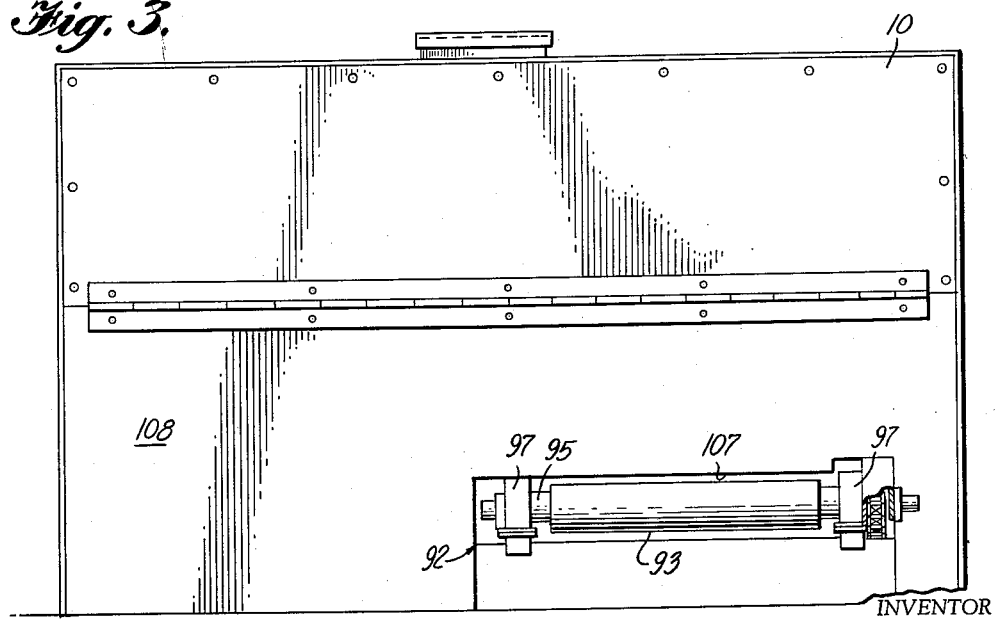
Figure 3 is an end elevation of the machine viewed from the discharge end of the machine.
Figure 5:
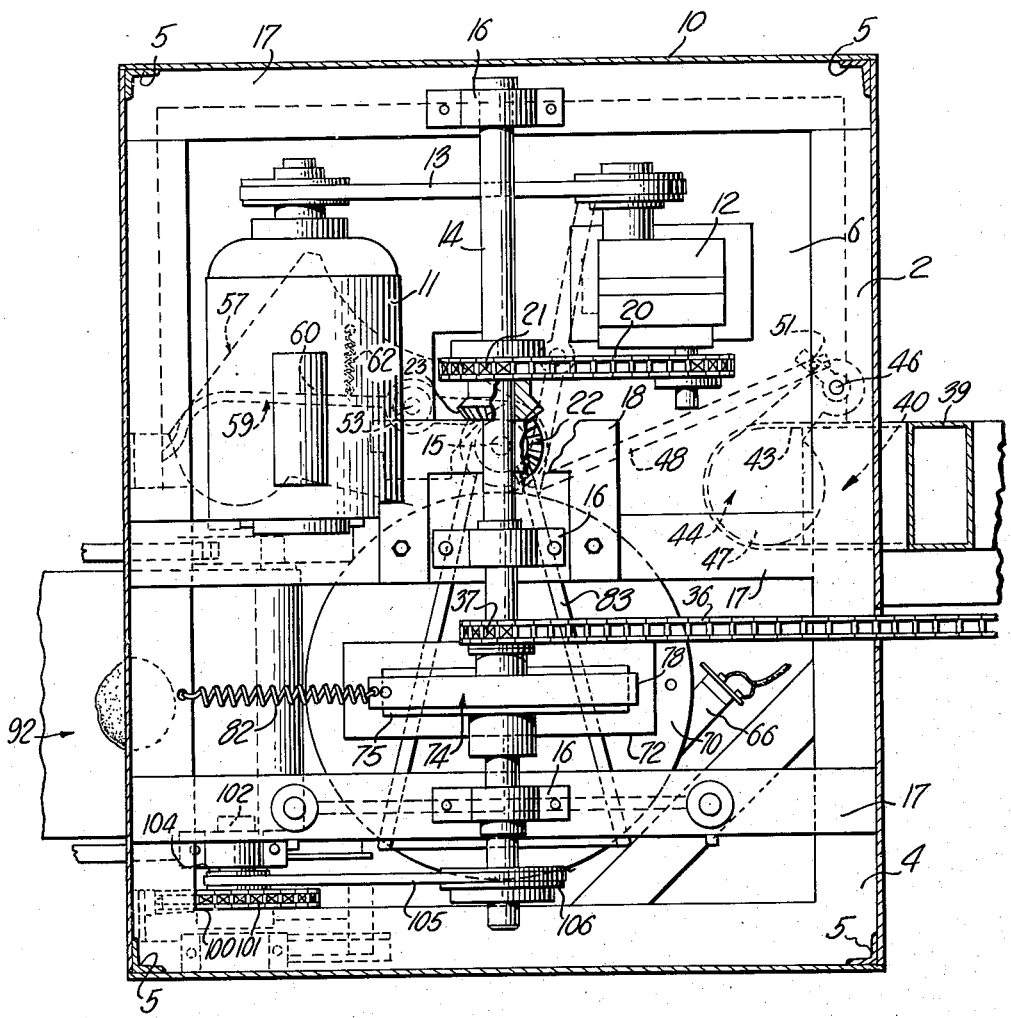
Figure 5 is a horizontal section taken just under the top cover on the line 5—5 of Figure 4, looking down on the mechanism.

Power from the reductor 12 is carried to the various parts of the machine by, and the several operating elements of the machine are mounted upon, a horizontal shaft 14 and a vertical shaft 15. Shaft 14 is journalled in bearings 16 mounted upon beams 17 which span the machine from side to side and are supported upon the horizontal flanges of the intermediate frame member 4 (see Figures 2 and 5). One of the beams 17 carries a U-shaped bracket 18 which projects to the rear of the beam and serves to journal the top of the vertical shaft 15. The lower end of shaft 15 is journalled in a cross-member 19 which extends from the lower frame member 2.

Shaft 14 is driven from the gear reductor 12 by means of a chain 20 which passes around a sprocket 21 fixed to the shaft 14. Shaft 15 is driven from the shaft 14 by bevel gears 22 and 23 fixed to the respective shafts. It will be evident that when the motor is started it will drive the gear reductor, and the reductor, in turn, will cause rotation of shafts 14 and 15.

Having described in general the frame of the machine which carries all of the machine structure, and the basic drive from which all of the moving parts of the machine are operated, it is thought that the machine can best be understood by describing the various mechanisms in the order in which they come into operation upon a dough patty passing through the machine.

Figure 4:
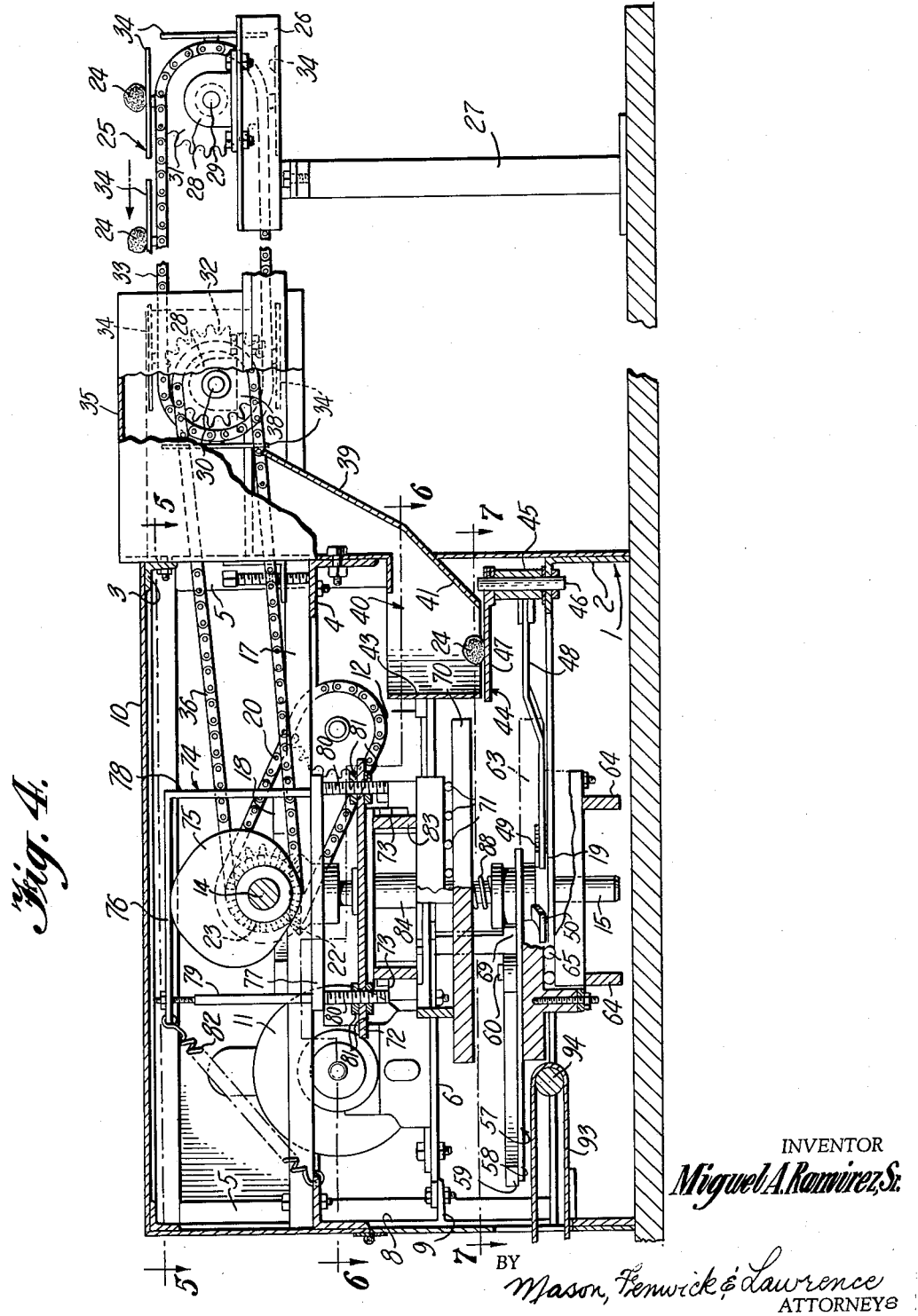
Figure 4 is a vertical longitudinal section through the machine, taken substantially on the line 4—4 of Figure 2.

Dough patties 24 are fed into the machine upon a delivery conveyor 25 (Figure 4). This conveyor is supported upon rails 26 which are attached at one end of the main frame of the machine. The opposite ends of the rails are held upon pedestals, or legs, 27. Bearings 28 are secured to the rails 26 and carry shafts 29 and 30 having sprockets 31 and 32 fixed to them. Chains 33 pass around the sprockets and carry a plurality of plates 34, which are uniformly spaced apart along the chains and form a series of supporting platforms for the dough patties. An operator standing alongside the conveyor can place patties upon the plates as they move into position on the top flight of the chains. The delivery end of the conveyor can be enclosed in a housing 35 if desired. The conveyor is driven by a chain 36 which passes around a sprocket 37 on shaft 14 and a sprocket 38 on shaft 30.

As the plates 34 reach the end of the top flight of the chains and start to pass around sprockets 32, they will tilt and dump the dough patties. Located directly below this point is the mouth of a patty chute 39, which is mounted for vertical adjustment on the rail 4. Patties falling from the plates 34 will drop into, and slide down, the chute. The chute opens through the side wall of the housing 10 of the machine and directs the course of the patties into an entrance throat 40. This consists of an inwardly declining bottom wall 41 and the side walls 42 and 43. The side walls terminate in a rounded end (see Figures 4, 6 and 7) which forms a stop to limit the travel of patties. The bottom of the chute adjacent the end is open so that the patties may fall through as will be described.

Positioned immediately below the bottom of the throat 40 is a patty receiving arm 44. This arm is provided with a downwardly projecting boss 45 through which a pivot pin 46 passes to pivotally mount the arm upon the frame member 2 for swinging movement in a horizontal plane. The outer end of the arm is relatively broad to form a receiving platform 47 upon which the patties sliding down the declining bottom of the throat 40 may come to rest. Pivotal movement of the arm will move the platform 47 to and from patty-receiving position beneath the throat.

The arm 44 is caused to be moved about its pivot by means of a link 48, a lever 49 and a cam 50 fixed to the shaft 15 near its bottom (see Figures 4, 7, 8 and 9). Link 48 has one end pivotally connected to a projection from boss 45 of arm 44, as at 51, and the other end pivotally connected to one end of the lever 49 at 52. Lever 49 is pivoted at a medial point, as at 53, upon an extension 19 of the cross member 2. Cam 50 has a single rise and is adapted to operate the linkage once each revolution of the shaft 15 to cause the arm 44 to move its platform 47 away from the patty receiving position and pass from beneath the outlet of the chute. The cam 50 strikes the lever 49 near the end which is connected to link 48, and that end of the lever is held closely adjacent the cam by means of a spring 54 which is connected to the opposite end of lever 49 and to the extension of the cross member 19. The spring can be connected to the lever at different distances from the pivotal point of the lever in any of a series of holes 55 in accordance with the degree of leverage desired. The movement of the lever toward cam engaging position is limited by means of a stop bracket 56 adjustably mounted upon the extension of the cross member 19. By this means, the position of the platform 47 of arm 44 beneath the entrance throat 40 can be accurately determined.

It will be seen that as the arm 44 rocks under the influence of the cam, it will pass under the walls of the chute throat, and the side wall of the chute will serve as a stop to contact and hold the dough patty against movement. This will permit the platform to rock out from beneath it and the dough patty to fall through the bottom opening.

At the time that the dough patty is dropped from the receiving arm, a transfer arm 57, fixed to shaft 15 to rotate with it, will be beneath the throat to receive the falling patty. The transfer arm consists essentially of a flat horizontal plate 58 fixed to the shaft 15, and a sweep 59 pivotally connected at 60 to the plate 58. The sweep is normally held by means of a spring 62 against a stop 61, mounted on the plate 58. The contour of the plate is such that supporting surfaces are provided for dough patties at all points needed, yet maintain the plate as narrow as possible to avoid occupying too great an arcuate area at one time during its rotative movement.

The transfer arm, in rotating with the shaft 15, will pass under the outlet of the chute throat 40, as described, and catch patties dropped from the receiving arm 44. Continued rotation of the transfer arm will carry it over the center of a heating plate 63, supported upon a pair of rails 64 (see Figure 4) having their ends attached to the bottom frame 2 and the cross member 19. The plate is shown as a disk with an electrical heating element 65 beneath it. The element 65 may be connected to any suitable source of electric power in the usual manner, and may be controlled by a thermostat 66 (Figures 5, 6 and 7) to maintain a constant heat in the plate 63. The thermostat should have a range of adjustment to permit controlling the plate temperature in accordance with requirements for the speed with which the machine is operated, and consequently the length of time the dough will be left on the plate.

As the transfer arm moves over the heating plate, the sweep 59 is moved across the plate in timed relation to the plate movement to sweep the dough from the trailing edge of the arm onto the center of the heating plate. To accomplish this, the sweep pivot 60 is intermediate the ends of the sweep providing a dough moving arm 67 and an actuating arm 68. Suspended from the platform 6 is a trip 69, which is positioned in the path of movement of the actuating arm 68 of the sweep. Thus, as the transfer arm rotates, the arm 68 of the sweep contacts the trip 69 causing the sweep to swing about its pivot and sweep the dough from the transfer arm. After the actuating arm 68 has passed the trip, spring 62 will return the sweep to its normal position against the stop 61.

Figure 7:
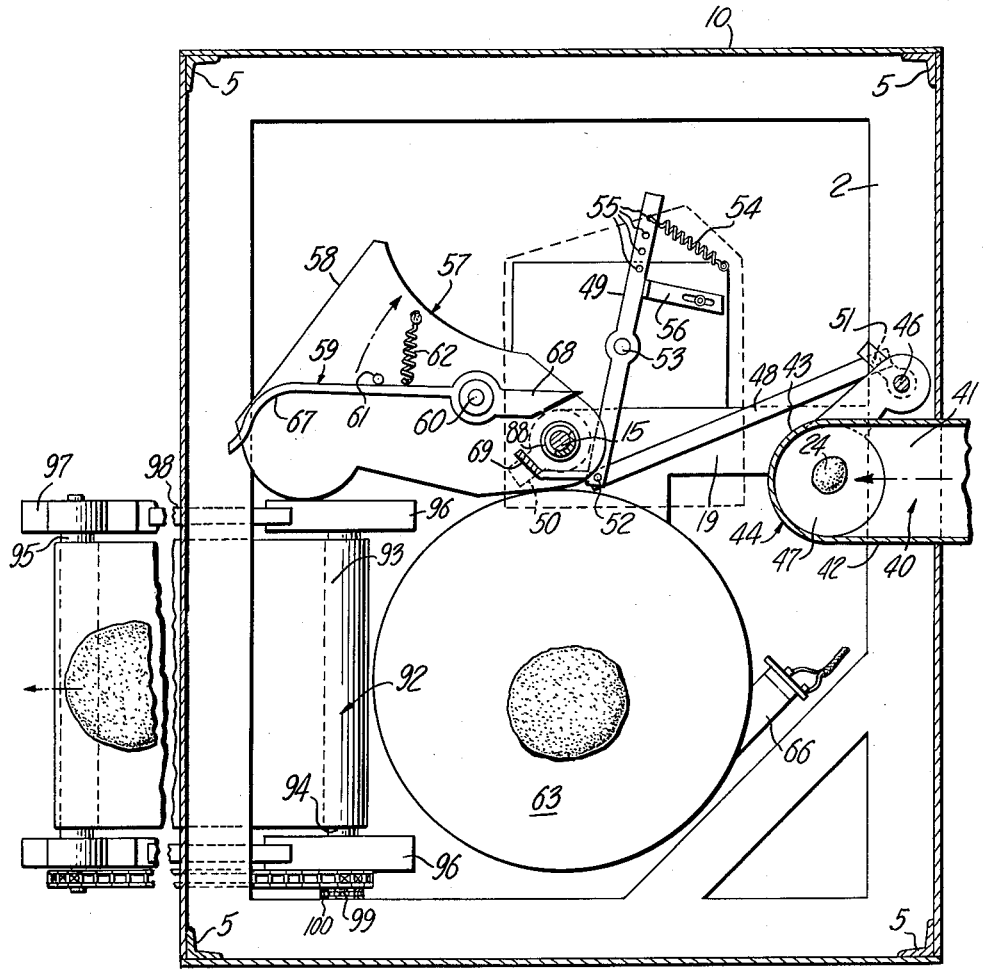
Figure 7 is a horizontal section taken on the line 7—7 of Figure 4, showing the bottom heating plate and the transfer means for moving dough patties from the delivery chute to the heating plate and from the plate to the discharge conveyor.

Continued rotation of the transfer arm will carry it completely beyond the heating plate 63 to the position shown in Figure 7. At this time, the heating plate is unobstructed, and a second movable heating plate 70 can move toward the plate 63 to compress the dough patty and partially cook it.

The top movable heating plate 70 is heated by an element 71, and both electric elements 65 and 71 are controlled by the thermostat 66. The top plate assembly is suspended from a cross-head 72 (see Figures 2, 4, 5 and 6) by connection to ears 73 depending from the cross-head. The cross-head, in turn, is suspended from a stirrup 74 which surrounds, and hangs from, a cam 75 mounted on the horizontal shaft 14. The stirrup 74 comprises a rectangular frame having top bar 76, bottom bar 77 and the side members 78 and 79. Projecting below the bottom bar 77 there are two studs 80 which pass through openings in the cross-head 72 and fixed by nuts 81. By adjustment of the nuts 81, the cross-head can be raised or lowered on the studs 80 to adjust the upper and lower limits of movement of the top heating plate under the influence of the cam 75. A spring 82 may be connected to the top of the stirrup 74 and to the machine frame to stabilize the gravity action of the top heating plate as the cam rotates.

In order to guide the top plate in its vertical travel, the top plate carries a V-shaped frame 83, and it is to the sides of this frame that the ears 73 of the cross-head 72 are connected. The point of the V of frame 83 is provided with a sleeve 84, and the ends of the arms of the frame are provided with sleeves 85. Sleeve 84 is slidably mounted on shaft 15 and sleeves 85 are mounted on vertical guide shafts 86 depending from the beams 17. Thus, the frame 83 will follow a prescribed path of vertical travel. Transfer arm 57 has an upstanding cup 87 about the shaft 15 to serve as a seat for a spring 88 which surrounds the lower portion of the shaft 15. Shafts 86 carry collars 89 to retain springs 90 upon them. The springs 88 and 90 will be contacted by sleeves 84 and 85 as the frame lowers to cushion the downward movement of the heating plate 70.

The lowering of the top plate will compress the dough on the bottom one and the dough will be partially cooked to a predetermined amount through contact with the hot plates. The cam 75 is so designed and oriented upon the shaft 14 that this action takes place during the time that the transfer arm is moving in an arc outside the periphery of the heating plates.

When the top heating plate lifts, the transfer arm will have received another dough patty and be moving toward the bottom heating plate to deposit it. As the leading edge 91 of the transfer arm moves over the heating plate it will contact the previously compressed and precooked product and push it from the plate onto a discharge conveyor 92.

The discharge conveyor is an endless belt 93 travelling around rollers 94 and 95 which are mounted in bearings 96 and 97, the bearing 96 being supported on frame member 2 and bearing 97 on an auxiliary frame 98 projecting from the side of the machine. Roller 94 carries a sprocket 99 which is driven by chain 100 from a sprocket 101 on a stub shaft 102 mounted on a bracket 103 on the frame. Shaft 102 carries a pulley 104 driven by a V-belt 105 from a pulley 106 on the horizontal shaft 14. The discharge conveyor operates through an opening 107 in the wall of the machine housing. If desired, the lower portion of the housing at that side of the machine may be hinged to open as a door 108 to give access to the interior of the machine.

In operating the machine, small quantities of the dough product to be processed will be placed upon the conveyor 25 and be carried forward and dumped into chute 39. The product will slide down the chute and out through the entrance throat 40 to come to rest upon the receiving platform 44. Once each revolution of the shaft 15, cam 50 through the linkage 48 and 49, will cause the receiving plate to move horizontally out from beneath the chute. The side walls of the chute surrounding the throat 40 terminate closely adjacent the level of the receiving platform and will serve to prevent sidewise movement of the dough product so that the product will be held immovable while the platform moves out from under it. The time cycle of operation is such that the transfer arm 57 will be beneath the chute throat 40 at the time the receiving platform moves laterally so that the dough product will fall upon the transfer arm behind the sweeper arm 67. The transfer arm is carried forward in its cycle of rotation which is clockwise as viewed in Figures 7, 8 and 9, to carry the dough product over the fixed plate 63. As the arm moves across the plate, the actuating arm 68 contacts the fixed cam 69 causing the sweeper arm to move about its pivot and sweep the dough product from the transfer arm to deposit it upon the fixed heater plate. During the time that the transfer arm is moving over the fixed plate, the upper movable plate 70 will, of course, be raised. As the transfer arm continues its rotative movement it will move out from between the plates and at this time cam 75 will have rotated so that the upper plate 70 is lowered toward the fixed plate to compress the dough product between them to form a relatively flat product. This product will be cooked, or partially cooked, as desired, through contact with the two heating plates. The speed of rotation of cam 75 is such that desired cooking will take place while the movable plate is in contact with the product. The upper plate will then lift. At this time the transfer arm has received another dough ball or patty as the case may be and will be again moving across the plate 63. Due to the fact that the transfer arm is closely adjacent to the surface of plate 63, the arcuate leading edge 58 of the arm will contact the pre-cooked tortilla product and sweep it from the plate onto the discharge belt 92. Belt 92 will carry the product to a desired discharge point.

While in the above one practical embodiment of the invention has been disclosed in detail, it will be understood that the specific details of structure shown and described are by way of illustration, and the invention may take other forms within the scope of the appended claims.

What is claimed is:

1. A dough product processing machine comprising, a frame, means to compress and partially cook the products mounted on the frame, means to deliver dough products to the compressing and cooking means, and means to convey processed products from the compressing and cooking means, the delivery means including a receiving platform, means to bring dough products to the receiving platform, a transfer arm movable alternately beneath the receiving platform and to the compressing and cooking means, means operable in timed relation with the transfer arm to move the receiving platform to dump dough products from the receiving platform to the transfer arm, and means to remove dough products from the transfer arm to the compressing and cooking means operable by movement of the transfer arm to the compressing and cooking means.

2. A dough product processing machine as claimed in claim 1 wherein, the compressing and cooking means includes a fixed heating plate, a vertically movable heating plate mounted above the fixed plate, and means to move the vertically movable plate toward and from the fixed plate in timed relation to the movement of the transfer plate.

3. A dough product processing machine as claimed in claim 2 wherein the transfer arm moves over the fixed heating plate, and the means for removing the products from the transfer arm includes a sweeper arm pivotally mounted on the transfer arm and a cam fixed to the frame for moving the sweeper arm relative to the transfer arm.

4. A dough product processing machine as claimed in claim 3 wherein the transfer arm is pivotally mounted for horizontal rotary movement and during each rotation it passes beneath the receiving platform and over the fixed heating plate.

5. A dough product processing machine as claimed in claim 1 wherein a chute delivers dough products to the receiving platform, said chute having an opening in its bottom directly over the receiving platform and positioned closely adjacent the receiving platform, the chute having retaining walls at the sides of the opening to hold dough products on the receiving platform against transverse movement, said means to move the receiving platform operating to move the platform transversely of the chute so that the platform will move from beneath the opening and dough products will be swept from the platform by contact with the chute walls.

6. A dough product processing machine comprising, a frame, a flat plate fixed to the frame and having its top surface horizontally disposed, a movable flat plate above the fixed plate and mounted on the frame for vertical movement toward and from the fixed plate, means to move the movable plate vertically in predetermined timed sequence, means to heat both of the plates, a receiving platform, means to deliver dough products to the receiving platform, and means including a transfer arm movable under the receiving platform and over the fixed plate to transfer the dough products from the receiving platform and deposit them on the fixed plate in timed relation to the vertical movement of the movable plate, means to move the receiving platform horizontally in timed relation with the operation of the transfer arm, and a wall member fixed to the frame and having a lower edge adjacent the platform to engage dough products on the platform and hold them stationary as the plaform is moved horizontally, whereby the platform may move from under the dough products and permit them to fall upon the transfer means.

7. A dough product processing machine comprising, a frame, a flat plate fixed to the frame and having its top surface horizontally disposed, a movable flat plate above the fixed plate and mounted on the frame for vertical movement toward and from the fixed plate, means to move the movable plate vertically in predetermined timed sequence, means to heat both of the plates, a receiving platform, means to deliver dough products to the receiving platform, and means including a transfer arm movable under the receiving platform and over the fixed plate to transfer the dough products from the receiving platform and deposit them on the fixed plate in timed relation to the vertical movement of the movable plate, a sweep pivotally mounted upon the transfer plate, and means to move the sweep relative to the arm to push dough products from the transfer arm onto the fixed plate as the transfer arm moves over the fixed plate.

8. A dough product processing machine comprising, a frame, a flat plate fixed to the frame and having its top surface horizontally disposed, a movable flat plate above the fixed plate and mounted on the frame for vertical movement toward and from the fixed plate, means to move the movable plate vertically in predetermined timed sequence, means to heat both of the plates, a receiving platform, means to deliver dough products to the receiving platform, and means including a transfer arm movable under the receiving platform and over the fixed plate to transfer the dough products from the receiving platform and deposit them on the fixed plate in timed relation to the vertical movement of the movable plate, a discharge conveyor, and the transfer means moving in close adjacency to the top surface of the fixed plate and having a leading edge to contact and push a previously deposited dough product from the plate onto the discharge conveyor as the transfer means moves to deposit another dough product on the fixed plate.

9. A dough product processing machine comprising, a frame, a flat plate fixed to the frame and having its top surface horizontally disposed, a movable flat plate above the fixed plate and mounted on the frame for vertical movement toward and from the fixed plate, means to move the movable plate vertically in predetermined timed sequence, means to heat both of the plates, a receiving platform, means to deliver dough products to the receiving platform, and means including a transfer arm movable under the receiving platform and over the fixed plate to transfer the dough products from the receiving platform and deposit them on the fixed plate in timed relation to the vertical movement of the movable plate, the receiving platform being movable horizontally, means to rotate said arm and to move said receiving platform, a wall member fixed to the frame and having a lower edge adjacent the platform to engage dough products on the platform and hold them against movement as the platform is moved beneath them, whereby the platform may be moved from under the dough products and permit them to fall upon the transfer arm.

10. In a dough product processing machine as claimed in claim 9, a sweep pivotally mounted upon the transfer arm, and means to move the sweep relative to the arm to push dough products from the transfer arm onto the fixed plate as the transfer arm moves over the fixed plate.

11. In a dough product processing machine as claimed in claim 10, means to discharge processed dough products from the machine, and the transfer arm moving in close adjacency to the top surface of the fixed plate and having a leading edge to contact and push a previously deposited dough product from the plate onto the discharge means as the transfer arm moves over the fixed plate.

References Cited in the file of this patent

UNITED STATES PATENTS

| 1,621,234 | Carpenter | Mar. 15, 1927 |
| 1,881,126 | Parr | Oct. 4, 1932 |
| 2,542,265 | Staples | Feb. 20, 1951 |
| 2,770,182 | Jensen | Nov. 13, 1956 |